United States Patent
Chen

(10) Patent No.: US 8,869,221 B2
(45) Date of Patent: Oct. 21, 2014

(54) DISPLAY APPARATUS AND VIDEO DISPLAY METHOD

(75) Inventor: Feng-Yuan Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 349 days.

(21) Appl. No.: 13/439,110

(22) Filed: Apr. 4, 2012

(65) Prior Publication Data

US 2013/0055328 A1 Feb. 28, 2013

(30) Foreign Application Priority Data

Aug. 30, 2011 (TW) .............................. 100131033 A

(51) Int. Cl.
- *H04N 7/173* (2011.01)
- *H04N 7/10* (2006.01)
- *G09G 5/00* (2006.01)
- *H04N 21/44* (2011.01)
- *H04N 21/4402* (2011.01)

(52) U.S. Cl.
CPC .......... *G09G 5/006* (2013.01); *H04N 21/44004* (2013.01); *H04N 21/4402* (2013.01); *G09G 2340/0442* (2013.01); *G09G 2370/047* (2013.01); *G09G 2370/10* (2013.01); *G09G 2370/12* (2013.01)
USPC ................... 725/110; 725/36; 725/40; 725/49

(58) Field of Classification Search
USPC ........................................ 725/36, 40, 49, 110
See application file for complete search history.

(56) References Cited

U.S. PATENT DOCUMENTS

| | | | |
|---|---|---|---|
| 8,161,509 B2 * | 4/2012 | Takatori | 725/36 |
| 8,352,994 B2 * | 1/2013 | Pham et al. | 725/107 |
| 2008/0122987 A1 | 5/2008 | Chang et al. | |

FOREIGN PATENT DOCUMENTS

TW 200920121 5/2009

OTHER PUBLICATIONS

English language translation of abstract of TW 200920121 (published May 1, 2009).

* cited by examiner

*Primary Examiner* — Nathan Flynn
*Assistant Examiner* — Sumaiya A Chowdhury
(74) *Attorney, Agent, or Firm* — McClure, Qualey & Rodack, LLP

(57) ABSTRACT

A display apparatus is provided. The display apparatus includes a first receiver, a display unit, a controller and a processor. The first receiver receives a network packet stream. The controller selectively sends one of a video signal generated by processing the network packet stream and an external video signal to the display unit for displaying the received video signal, according to a control signal. The processor determines whether the network packet stream comprises a display command. The processor sends the control signal to the controller for receiving and sending the video signal of the network packet stream to the display unit, when the network packet stream includes the display command.

15 Claims, 3 Drawing Sheets

DISPLAY APPARATUS AND VIDEO DISPLAY METHOD

CROSS REFERENCE TO RELATED APPLICATIONS

This Application claims priority of Taiwan Patent Application No. 100131033, filed on Aug. 30, 2011, the entirety of which is incorporated by reference herein.

BACKGROUND OF THE INVENTION

1. Field of the Invention

The present invention relates to a display apparatus, and in particular relates to a display apparatus with an automatic switching function.

2. Description of the Related Art

Typically, digital televisions transfer a video signal to a display panel through an interface to display the corresponding video image, after the de-interlacing, scaling, quality processing and color processing processes.

Current display devices, such as cathode ray tube televisions (CRT TV), liquid crystal display televisions (LCD TV) and plasma televisions, adopt the on-screen display (OSD) processing technique to produce some special messages and graphics on the screen for users to control the display devices. The display devices also display the current status corresponding to the channels, volume or quality when the user changes channels, adjusts volume or quality, etc. Currently, OSD control chips or OSD control circuits display the setting by value or lattice when the user adjusts volume or brightness, etc, and integrate quite a few functions, such as brightness, contrast, shift, barrel distortion, keystone distortion, parallelogram distortion, and pincushion phenomenon adjustments and so on.

It is noted that, the multi-functional digital TVs can receive video signals though a variety of input interfaces. The current design of the multi-functional digital TVs for users uses the OSD interface or other manual switching mode to determine the image displayed on the multi-functional digital TVs. The multi-functional digital TVs can not automatically switch the image but need users to manually switch the display of the image when a user needs to switch the image, such that additional settings or switching of the current multi-functional digital TVs cause inconvenience of operation.

BRIEF SUMMARY OF THE INVENTION

A detailed description is given in the following embodiments with reference to the accompanying drawings.

The present invention provides a display apparatus including a first receiver, a display unit, a controller and a processor. The first receiver receives a network packet stream. The controller selectively sends one of a video signal generated by processing the network packet stream and an external video signal to the display unit according to a control signal for displaying the received video signal. The processor determines whether the network packet stream comprises a display command, wherein the processor sends the control signal to the controller for receiving and sending the video signal of the network packet stream to the display unit when the network packet stream comprises the display command.

Additionally, the present invention further provides a video display method. In the method, a network packet stream is received, and whether a controller is in a multimedia application mode or an external signal mode is determined. When the controller is in the external signal mode, the controller is switched to the multimedia application mode to receive and send a video signal generated by processing the network packet stream to a display unit according to a first control signal. Finally, the video signal generated by processing the network packet stream is displayed on the display unit.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
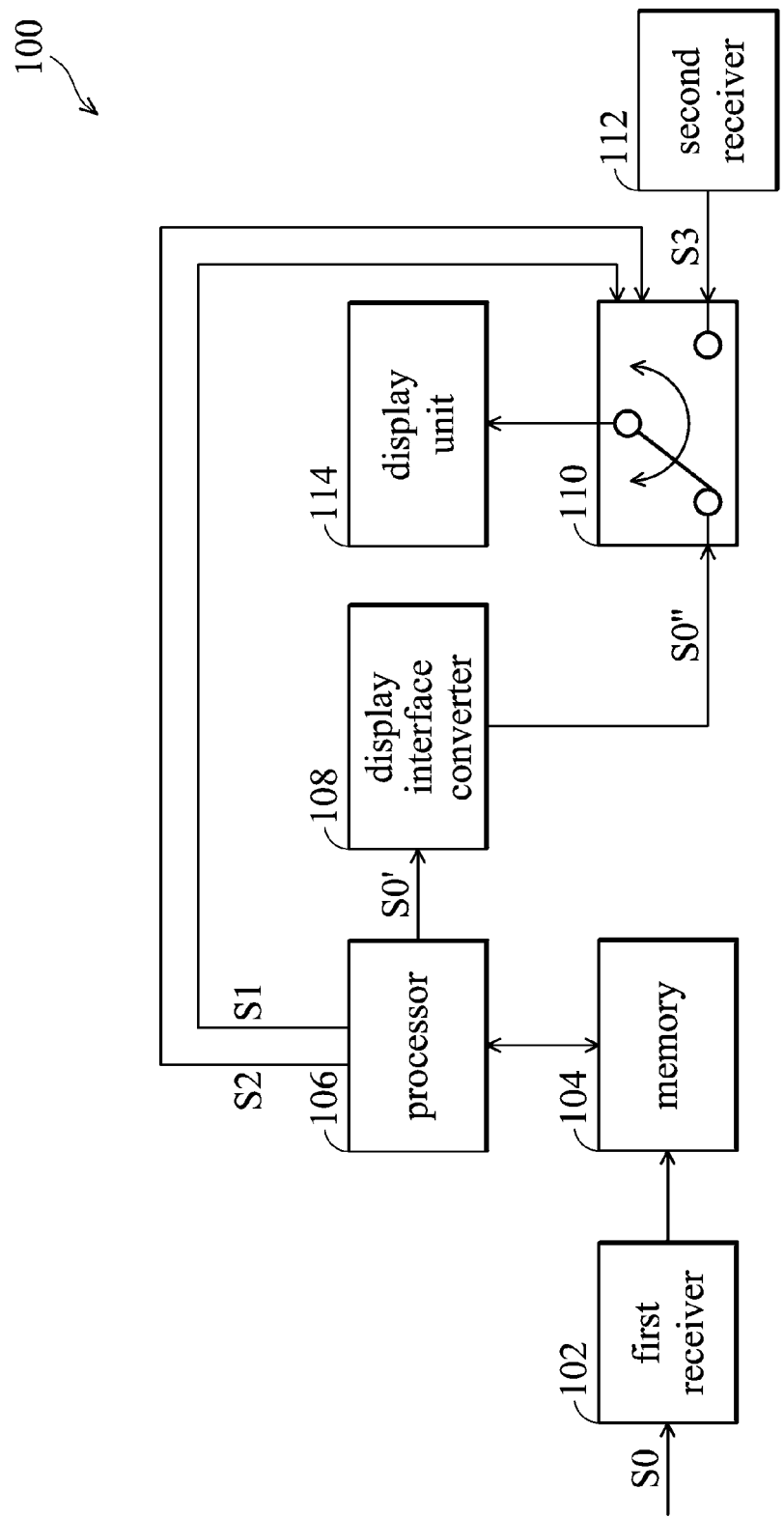
FIG. 1 is a schematic diagram illustrating an embodiment of a display apparatus of the present invention.

FIG. 1 is a schematic diagram illustrating an embodiment of a display apparatus of the present invention. In the embodiment, the display apparatus 100 is a digital display device, such as a digital television, but the present invention is not limited thereto. The display apparatus 100 includes a first receiver 102, a memory 104, a processor 106, a display interface converter 108, a controller 110, a second receiver 112 and a display unit 114. The first receiver 102 receives a network packet stream S0, wherein the network packet stream S0 includes video signals and commands which are transferred by a package. The display unit 114 displays a variety of video signals, such as the video signal of the network packet stream S0. The controller 110 selectively sends one of a video signal (i.e. the network video signal S0"), which is generated by processing the network packet stream S0, and an external video signal S3 to the display unit 114 according to a control signal S1 for the display unit 114 to display the received video signal. Moreover, the controller 110 stores a display status of the display unit 114 when controller 110 receives the control signal S1, wherein the display status includes a information of a channel, an interface and a section of a current image in the video signal displayed by the display unit 114.

The processor 106 determines whether the network packet stream S0 includes a display command. When the network packet stream S0 includes the display command, the control signal S1 is transmitted to the controller 110 for the controller 110 to receive and transmit the video signal of network packet stream S0 to the display unit 114. In addition, the processor 106 decodes the network packet stream S0, and obtains a network video signal S0'. The display interface converter 108 converts the network video signal S0' to the converted network video signal S0" which is a format compatible with the display unit 114, and transmits the converted network video signal S0" to the display unit 114. The memory 104 stores the network packet stream S0 which is received by the first receiver 102. The second receiver 112 receives the external video signal S3 from at least one electronic device (not shown), and transmits the external video signal S3 to the controller 110 directly.

Furthermore, the processor 106 determines whether the converted network video signal S0" or the external video signal S3 displayed by the display unit 114 is normally displayed. In the embodiment, the controller 110 enters a multimedia application mode when the controller 110 is switched to the video signal (converted network video signal S0") of network packet stream S0. On the contrary, the controller 110 enters an external signal mode when the controller 110 is switched to the external video signal S3. When the processor 106 determines that the converted network video signal S0" or the external video signal S3 is abnormally being displayed, the processor 106 recovers the controller 110 to the stored display status. In the embodiment, the network packet stream S0 is transmitted to the first receiver 102 through a wireless network, wherein the wireless network can be a DLNA network (Digital Living Network Alliance), a WIFI network or a 3G network, but is not limited thereto. In the embodiment, the external video signal S3 received by the second receiver 112 is not transferred by the package. For example, the external video signal S3 can be the signal which is compatible with the HDMI, VGA or DVI interfaces. In the other embodiments, the external video signal S3 can also be the signal transferred by the wireless network, but is not limited thereto.

Figure 2A:
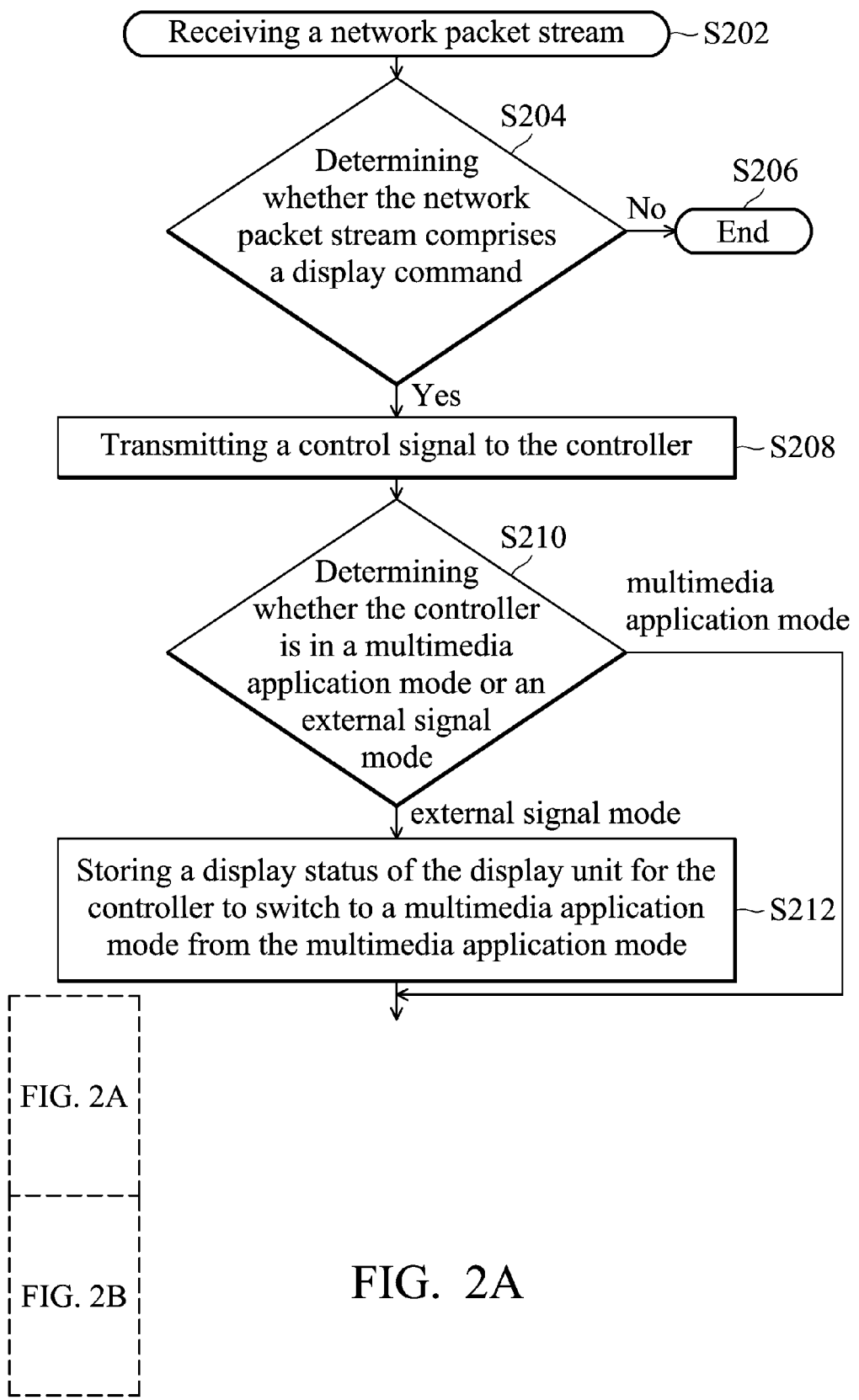
FIGS. 2A and 2B is a flowchart of a video display method according to an embodiment of the present invention.
Figure 2B:
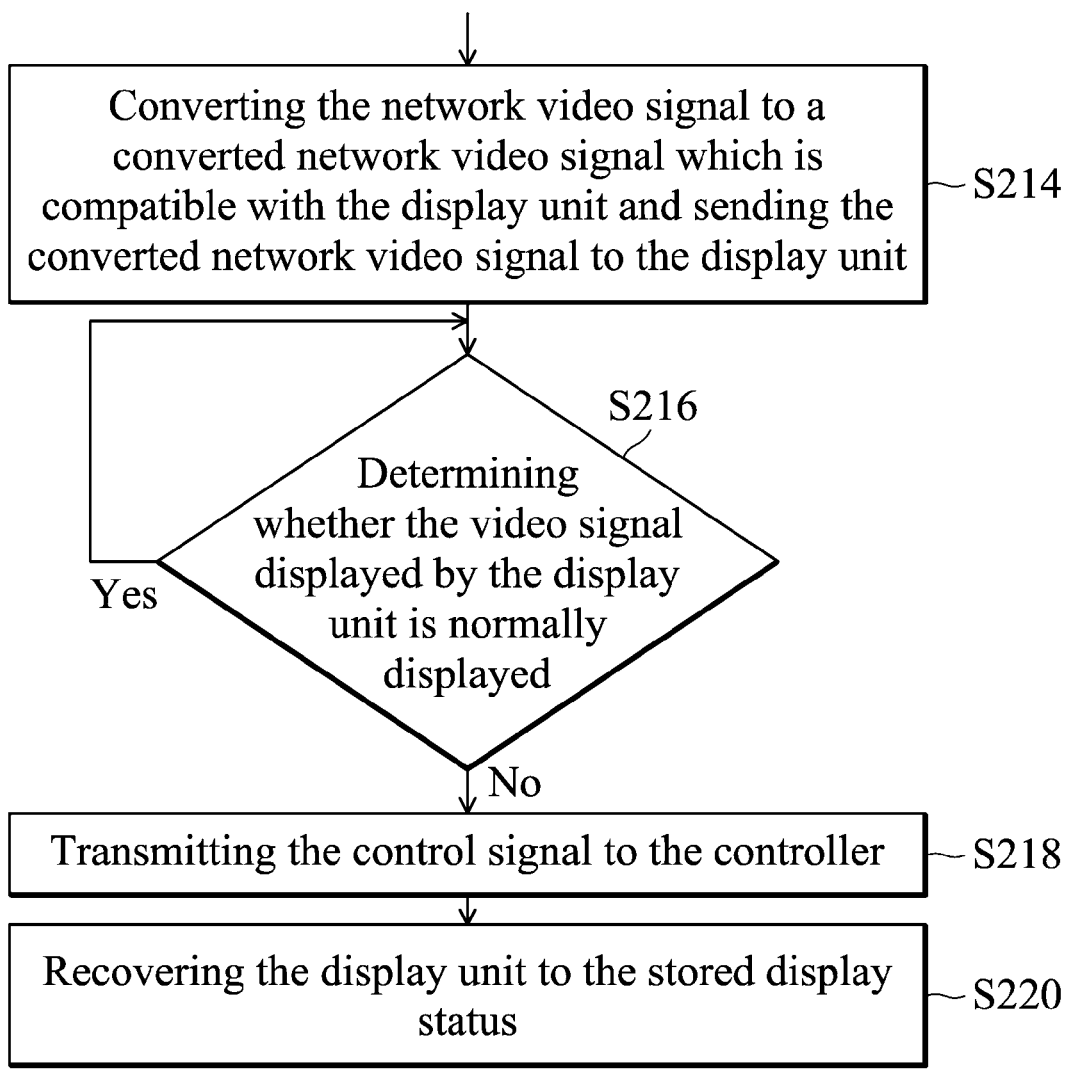

FIGS. 2A and 2B is a flowchart of a video display method according to an embodiment of the present invention. First, the first receiver 102 receives a network packet stream S0 (step S202).

The processor 106 determines whether the network packet stream S0 includes a display command (step S204). When the processor 106 determines that the network packet stream S0 does not include the display command, the video display method ends (step S206). When the processor 106 determines that the network packet stream S0 includes the display command, the processor 106 transmits a control signal S1 to the controller 110 (step S208).

When the processor 106 transmits the control signal S1 to the controller 110, the processor 106 determines whether the controller 110 is in a multimedia application mode or an external signal mode (step S210). When the processor 106 determines that the controller 110 is in the external signal mode, the controller 110 stores a display status of the display unit 114, for the controller 110 to switch to a multimedia application mode from the multimedia application mode to receive the video signal generated by processing the network packet stream S0 according to the control signal S1 (step S212). In the embodiment, the controller 110 is switched to the video signal of network packet stream in the multimedia application mode. On the contrary, the controller 110 is switched to the signal which is not transferred by the network package (i.e. the signal of HDMI VGA and DVI) in the external signal mode, but it is not limited thereto.

When processor 106 determines that the controller 110 is in the multimedia application mode or the controller 110 is already switched to the multimedia application mode from the external signal mode according to the control signal S1, the display interface converter 108 determines the format of the network video signal S0', which is generated by decoding the network packet stream S0, converts the network video signal S0' to a converted network video signal S0" which is compatible with the display unit 114 according to the format of network video signal S0', and transmits the converted network video signal S0" to the display unit 114 (step S214).

Then, the processor 106 determines whether the video signal displayed by the display unit 114 is normally displayed (step S216). When the processor 106 determines that the video signal displayed by the display unit 114 is abnormally being displayed, the processor 106 sends the control signal S2 to the controller 110 (step S218). When the processor 106 determines that the video signal of the display unit 114 is normally displayed, the processor 106 continues to determine whether the video signal displayed by the display unit 114 is normally displayed.

When the processor 106 transmits the control signal S2 to the controller 110, the controller 110 recovers the display unit 114 to the stored display status according to the control signal S2 (step S220). For example, when the controller 110 receives the control signal S2, the controller 110 recovers the display unit 114 to the video signal which is displayed before a user switches the channel. The process ends at step S220.

According to the display apparatus 100 and video display method of the present invention, when the display apparatus 100 displays the external video signal S3, a user transfers the video content of the other electronic device (not shown) to the display apparatus 100 through a wireless or wired network, such that the display apparatus 100 automatically switches to the multimedia application mode from the external signal mode, and displays the video content of the electronic device. In the other embodiments of the present invention, when the display apparatus 100 displays the external video signal S3 and the user transfers the video content of the other electronic device (not shown) to the display apparatus 100 through a wireless or wired network, the display apparatus 100 confirms whether the electronic device has been successfully connected. When the electronic device has been successfully connected to the display apparatus 100, the display apparatus 100 automatically switches to the multimedia application mode from the external signal mode. Moreover, when the processor 106 determines that the video signal of the network packet stream S0 is abnormally being displayed, the controller 110 determines whether the external video signal S3 can be displayed according to the control signal S2. When the external video signal S3 can be displayed, the controller 110 recovers the display unit 114 to the stored display status. When both of the video signal of the external video signal S3 and the network packet stream S0 can not be displayed, the processor 106 (or the controller 110) shuts down the display unit 114.

Based on the above disclosure, the display apparatus 100 and the video display method of the present invention can automatically switch and recover to the input interface which was displayed with previous contents.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display apparatus, comprising:
    a first receiver for receiving a network packet stream;
    a display unit;
    a controller for selectively transmitting one of a video signal generated by processing the network packet stream and an external video signal according to a control signal so that the display unit displays the received video signal; and
    a processor for determining whether the network packet stream comprises a display command, wherein the processor transmits the control signal to the controller for receiving and transmitting the video signal of the network packet stream to the display unit when the network packet stream comprises the display command.

2. The display apparatus as claimed in claim 1, further comprising a display interface converter for converting a network video signal generated by decoding the network packet stream through the processor to a format compatible with the display unit, and transmitting the converted network video signal to the display unit.

3. The display apparatus as claimed in claim 1, further comprising a memory for storing the network packet stream received by the first receiver.

4. The display apparatus as claimed in claim 1, further comprising a second receiver for receiving the external video signal from at least one electronic device and transmitting the received external video signal to the controller.

5. The display apparatus as claimed in claim 1, wherein the controller stores a display status of the display unit when the controller receives the control signal, and the display status comprises an information of a channel, an interface and a section of a current image in the video signal displayed by the display unit.

6. The display apparatus as claimed in claim 1 wherein the processor determines whether the displayed video signal is normally displayed, and the processor recovers the controller to the stored display status when the displayed video signal is abnormally being displayed.

7. The display apparatus as claimed in claim 1, wherein the network packet stream is transmitted to the first receiver through a wireless network.

8. The display apparatus as claimed in claim 7, wherein the wireless network is a DLNA network.

9. The display apparatus as claimed in claim 1, wherein the external video signal is compatible with the HDMI, VGA or DVI interfaces.

10. A video displaying method, comprising:
    receiving a network packet stream;
    determining whether the network packet stream comprises a display command;
    transmitting a first control signal to the controller when the network packet stream comprises the display command;
    determining whether a controller is in a multimedia application mode or an external signal mode;
    forcing the controller to switch to the multimedia application mode to receive and transmit a video signal generated by processing the network packet stream to a display unit according to the first control signal when the controller is in the external signal mode; and
    displaying the video signal generated by processing the network packet stream on the display unit.

11. The video displaying method as claimed in claim 10, further comprising:
    determining a format of a network video signal generated by decoding the network packet stream; and
    converting the network video signal to a format compatible with the display unit according to the determined format of the network video signal and transmitting the format compatible with the display unit to the display unit.

12. The video displaying method as claimed in claim 10, further comprising:
    storing a display status of the display unit when the controller is in the external signal mode;
    determining whether the displayed video signal is normally displayed;
    transmitting a second control signal to the controller when the displayed video signal is abnormally being displayed; and
    recovering the display unit to the stored display status according to the second control signal.

13. The video displaying method as claimed in claim 10, wherein the network packet stream is sent to a first receiver through a wireless network.

14. The video displaying method as claimed in claim 13, wherein the wireless network is a DLNA network.

15. The video displaying method as claimed in claim 10, wherein the external video signal is compatible with the HDMI, VGA or DVI interfaces.

* * * * *